(12) United States Patent
Kurihara et al.

(10) Patent No.: US 11,266,982 B2
(45) Date of Patent: Mar. 8, 2022

(54) EXHAUST GAS PURIFICATION CATALYST

(71) Applicant: Mitsui Mining & Smelting Co., Ltd., Tokyo (JP)

(72) Inventors: Hiroki Kurihara, Saitama (JP); Yu Sakurada, Saitama (JP); Yusuke Nagai, Saitama (JP); Yoshinori Endo, Saitama (JP); Takeshi Nabemoto, Saitama (JP); Shingo Akita, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 23 days.

(21) Appl. No.: 16/976,778

(22) PCT Filed: Mar. 19, 2019

(86) PCT No.: PCT/JP2019/011581
§ 371 (c)(1),
(2) Date: Aug. 31, 2020

(87) PCT Pub. No.: WO2019/188618
PCT Pub. Date: Oct. 3, 2019

(65) Prior Publication Data
US 2021/0039080 A1 Feb. 11, 2021

(30) Foreign Application Priority Data
Mar. 30, 2018 (JP) .............................. JP2018-069908

(51) Int. Cl.
*F01N 3/28* (2006.01)
*B01J 35/04* (2006.01)
(Continued)

(52) U.S. Cl.
CPC .............. *B01J 35/04* (2013.01); *B01J 21/066* (2013.01); *B01J 23/10* (2013.01); *B01J 35/006* (2013.01);
(Continued)

(58) Field of Classification Search
CPC ......... B01J 35/04; B01J 35/004; F01N 3/035; F01N 2510/0684; B01D 2255/9032
(Continued)

(56) References Cited

U.S. PATENT DOCUMENTS 6,753,294 B1 * 6/2004 Brisley ................. F01N 3/0231
502/439
7,119,044 B2 * 10/2006 Wei .................... B01D 53/9431
502/300
(Continued)

FOREIGN PATENT DOCUMENTS

EP 2002892 A2 12/2008
EP 2105271 A1 9/2009
(Continued)

OTHER PUBLICATIONS

International Search Report (ISR) dated May 28, 2019 filed on PCT/JP2019/011581.

*Primary Examiner* — Tom P Duong
(74) *Attorney, Agent, or Firm* — Rankin, Hill & Clark LLP

(57) ABSTRACT

A substrate (11) of an exhaust gas purification catalyst (10) includes inflow-side cells (21), outflow-side cells (22), and porous partition walls (23), each porous partition wall separating the cells (21, 22) from each other. A first catalyst portions (14) is provided at least on a portion of a side of the partition wall (23) that faces the inflow-side cell (21), the portion being located on an upstream side in an exhaust gas flow direction, and a second catalyst portion (15) is provided
(Continued)

at least on a portion of a side of the partition wall that faces the outflow-side cell, the portion being located on a downstream side in the exhaust gas flow direction. A first pore volume is greater than a second pore volume, where the first pore volume is a pore volume of pores with a pore size of 10 μm to 18 μm, as measured on the first catalyst portions (14) and the partition walls (23) within a region where the first catalyst portions (14) are provided, and the second pore volume is a pore volume of pores with a pore size of 10 μm to 18 μm, as measured on the second catalyst portions (15) and the partition walls (23) within a region where the second catalyst portions (15) are provided. The first catalyst portion (14) exhibits the peak top of the pore size at between 20 nm and 500 nm.

3 Claims, 2 Drawing Sheets

(51) Int. Cl.
  *B01J 21/06* (2006.01)
  *B01J 23/10* (2006.01)
  *B01J 35/00* (2006.01)
  *B01J 35/10* (2006.01)
  *F01N 3/035* (2006.01)

(52) U.S. Cl.
  CPC ....... *B01J 35/1004* (2013.01); *B01J 35/1038* (2013.01); *B01J 35/1042* (2013.01); *B01J 35/1052* (2013.01); *F01N 3/035* (2013.01); *F01N 3/281* (2013.01); *F01N 2510/0684* (2013.01)

(58) Field of Classification Search
  USPC ......................................................... 422/180
  See application file for complete search history.

(56) References Cited

U.S. PATENT DOCUMENTS

| | | | |
|---|---|---|---|
| 2006/0100101 A1 | 5/2006 | Tsuji et al. | |
| 2010/0293930 A1* | 11/2010 | Li | B01D 53/9454 60/299 |
| 2011/0179777 A1* | 7/2011 | Chandler | F01N 3/10 60/297 |
| 2012/0222411 A1* | 9/2012 | Yano | B01D 53/9418 60/297 |
| 2015/0209760 A1* | 7/2015 | Asanuma | B01J 35/023 502/304 |
| 2015/0343423 A1* | 12/2015 | Hirose | B01J 37/088 423/213.2 |
| 2016/0288097 A1* | 10/2016 | Nagao | B01J 21/063 |
| 2017/0036153 A1* | 2/2017 | Takizawa | B01D 46/0027 |
| 2017/0296969 A1 | 10/2017 | Ohashi et al. | |
| 2019/0009254 A1 | 1/2019 | Clowes et al. | |
| 2019/0120104 A1 | 4/2019 | Inoda et al. | |

FOREIGN PATENT DOCUMENTS

| | | |
|---|---|---|
| EP | 3207989 A1 | 8/2017 |
| JP | 2010-42396 A | 2/2010 |
| JP | 2016-78016 A | 5/2016 |
| WO | 2017/109514 A1 | 6/2017 |
| WO | 2017/175574 A1 | 10/2017 |

* cited by examiner

EXHAUST GAS PURIFICATION CATALYST

TECHNICAL FIELD

The present invention relates to an exhaust gas purification catalyst.

BACKGROUND ART

For internal combustion engines including diesel engines and gasoline engines, gasoline direct injection engines (hereinafter also referred to as GDI engines) are now widely used in order to comply with fuel economy standards becoming stricter year by year especially for gasoline engines. It is known that GDI engines have low fuel consumption and provide high output, but that the amount of particulate matter (hereinafter also referred to as PM, including soot) emitted in exhaust gas is 5 to 10 times or more larger than that of conventional port fuel injection engines. In order to comply with environmental restrictions for PM emission, vehicles having a gasoline engine such as a GDI engine are also required to include a filter that has a function for collecting PM (gasoline particulate filter, hereinafter also referred to as GPF), as with diesel engines.

In general, the space for installing an exhaust gas purification catalyst is limited, and thus an exhaust gas purification catalyst has come into use in recent years that includes a filter as described above and a noble metal three-way catalyst such as Pd, Pt, or Rh supported on the filter to collect PM and also purify nitrogen oxide ($NO_x$), carbon monoxide (CO), hydrocarbon (HC), and the like.

For example, Patent Literature 1 discloses a filter catalyst having a function for collecting PM as a filter for diesel engines. The filter catalyst includes a catalyst-supporting substrate in which a plurality of cells whose opposite end openings are sealed alternately are demarcated by a cell wall, the cell wall having multiple continuous pores. In this filter catalyst, the first catalyst portion is formed on the surface of the cell wall on the upstream side of the cells, and the second catalyst portion is formed on the surface in the inner part of the cell wall on the downstream side of the cells. Patent Literature 1 discloses that the filter catalyst is produced by forming respective layers for supporting a catalyst on the upstream side and the downstream side of the substrate, dipping the substrate into a liquid containing a catalytically active component, drying the liquid coating, and firing the substrate with the coating, thereby allowing the two catalyst-supporting layers to support the same catalytically active component.

Patent Literature 2 discloses, as a catalyst device for diesel engines, an oxidation catalyst device for purifying exhaust gas that can burn and purify particulates in exhaust gas. The oxidation catalyst device includes a porous filter substrate including inflow cells, outflow cells, and cell partition walls, and a catalyst supported on the substrate. The catalyst includes the first catalyst layer formed on a surface of the cell partition wall that faces to the inflow cell and the second catalyst layer formed on wall surfaces of pores of the cell partition wall.

CITATION LIST

Patent Literature

Patent Literature 1: US 2006/100101
Patent Literature 2: JP 2010-42396A

SUMMARY OF INVENTION

Both of the filters disclosed in the patent literatures above are designed for diesel engines. Diesel engines are intended to be used in a temperature environment of about 800° C. at most, and the designs of these filters are not suited to gasoline engines, in which the combustion temperature exceeds 1000° C. Moreover, although these patent literatures are aimed at removal of PM and improvement of exhaust gas purification performance, they do not provide a design that delivers sufficient exhaust gas purification performance even during high speed driving.

An object of the present invention is to provide an exhaust gas purification catalyst that has high heat resistance and delivers good exhaust gas purification performance during high speed driving.

The inventors of the present invention have conducted in-depth studies on the configuration of a filter catalyst that has a wall flow structure, for achieving high heat resistance and good exhaust gas purification performance during high speed driving. As a result, a PM collecting filter catalyst that has excellent heat resistance and delivers good exhaust gas purification performance even under conditions of a high space velocity, such as during high speed driving, has been obtained by employing a configuration such that a catalyst layer disposed on the upstream side in the exhaust gas flow direction exhibits the main peak of pore size within a specific range, and that pore volumes in two catalyst layer regions of the cell partition wall satisfy a specific relationship.

Specifically, the present invention provides an exhaust gas purification catalyst including: a substrate, and catalyst portions provided in the substrate, the substrate including:
  inflow-side cells, each inflow-side cell being a space having an open end located on an inflow side thereof and a closed end located on an outflow side thereof in an exhaust gas flow direction;
  outflow-side cells, each outflow-side cell being a space having a closed end located on an inflow side thereof and an open end located on an outflow side thereof in the exhaust gas flow direction; and
  porous partition walls, each porous partition wall separating the inflow-side cell and the outflow-side cell from each other, and
the catalyst portions including:
a first catalyst portion that is provided at least on a portion of a side of that faces the inflow-side cell, the portion being located on an upstream side in the flow direction; and
a second catalyst portion that is provided at least on a portion of a side of the partition wall that faces the outflow-side cell, the portion being located on a downstream side in the flow direction,
  wherein, a first pore volume is greater than a second pore volume, where the first pore volume is a pore volume of pores with a pore size of 10 μm to 18 μm, as measured on the first catalyst portions and the partition walls within a region where the first catalyst portions are provided, and where the second pore volume is a pore volume of pores with a pore size of 10 μm to 18 μm, as measured on the second catalyst portions and the partition walls within a region where the second catalyst portions are provided, and
    the first catalyst portion exhibits a peak top of the pore size at between 20 nm and 500 nm.

DESCRIPTION OF EMBODIMENTS

Hereinafter, the present invention will be described by way of a preferred embodiment thereof, but the present invention is not limited to the embodiment given below.

Figure 1:
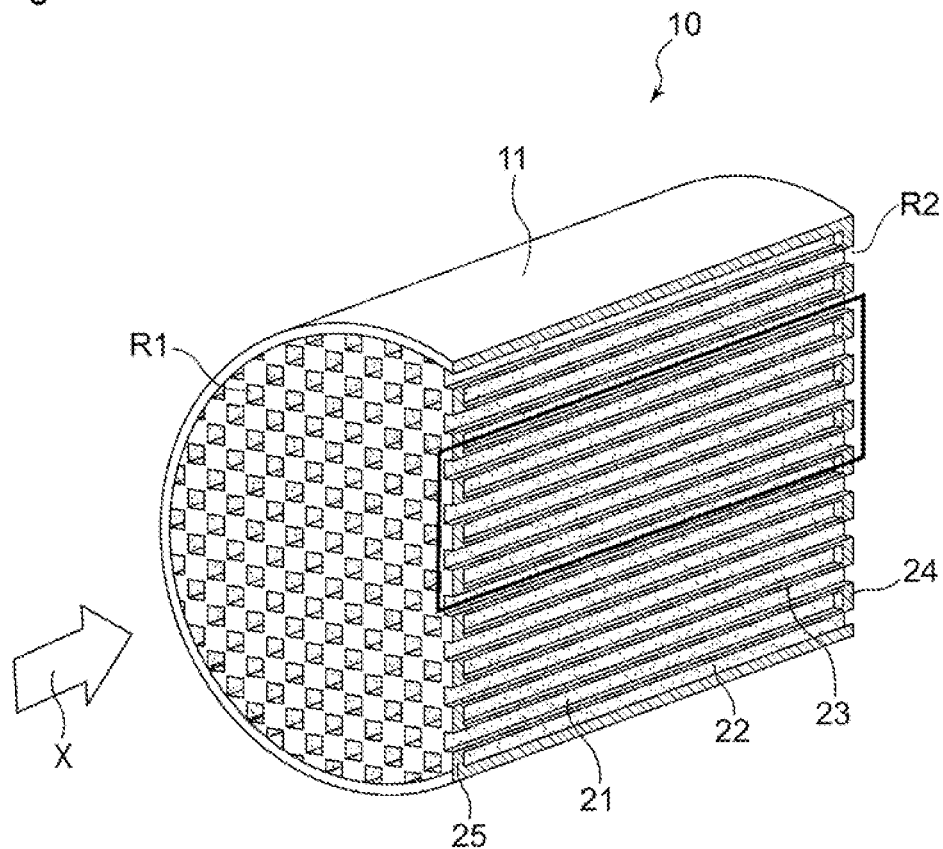
FIG. 1 is a schematic view of an exhaust gas purification catalyst according to an embodiment of the present invention.
Figure 2:
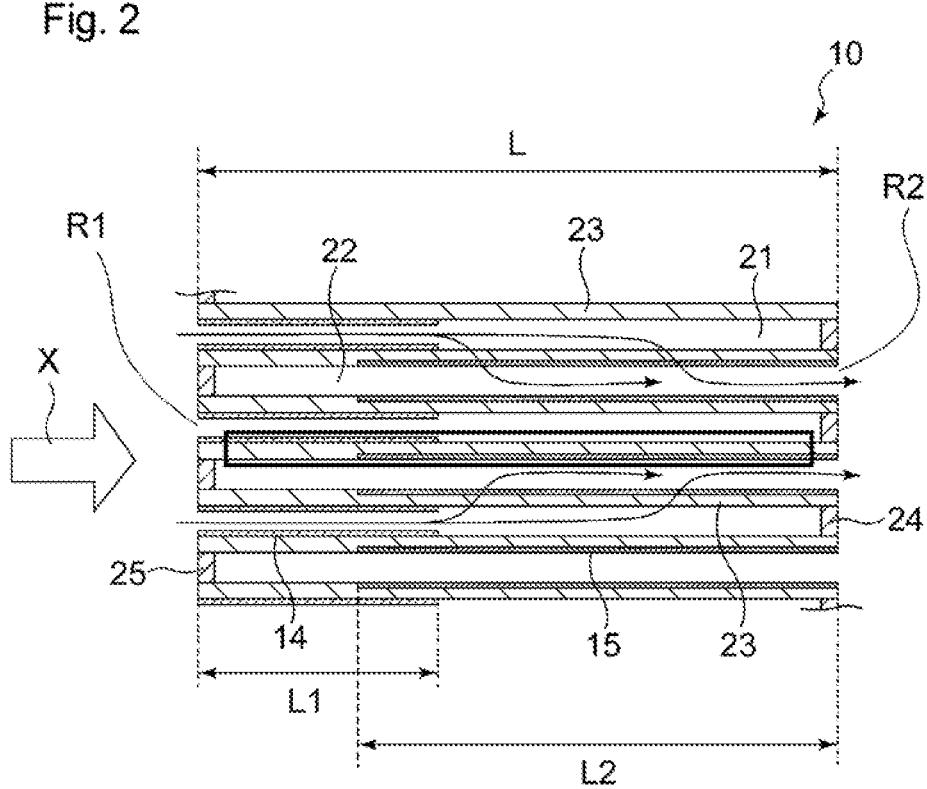
FIG. 2 is a cross section of a portion surrounded by a rectangle in FIG. 1, taken along the axis direction of a substrate.
Figure 3:
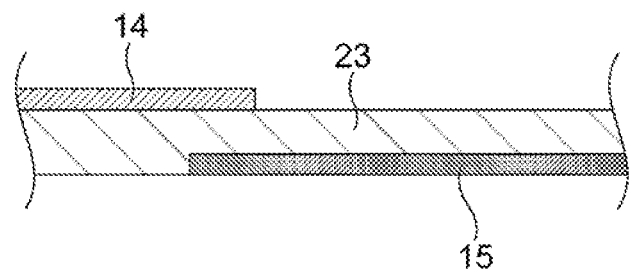
FIG. 3 is an enlarged view of a portion surrounded by a rectangle in FIG. 2.

FIGS. 1 to 3 show an example of an exhaust gas purification catalyst 10 according to the present embodiment. The diagrams merely show a schematic example of an exhaust gas purification catalyst, and are not intended to limit the present invention in any way.

The exhaust gas purification catalyst 10 is provided in an exhaust path of an internal combustion engine such as a diesel engine or a gasoline engine, in particular, a GDI engine for vehicles. The exhaust gas purification catalyst 10 is used as, for example, a GPF.

As shown in FIG. 1, the exhaust gas purification catalyst 10 includes a substrate 11 that has a so-called wall flow structure. Substrates made of various materials can be used as the substrate 11. For example, a substrate made of ceramic such as cordierite or silicon carbide (SiC) or an alloy such as stainless steel can be favorably used. Usually, the substrate has a cylindrical outer shape as shown in FIG. 1, and is disposed in an exhaust gas flow path such that the axis direction of the cylindrical outer shape substantially matches an exhaust gas flow direction X. FIG. 1 shows a substrate that has a circular cylindrical outer shape as an example; however, the outer shape of the substrate as a whole may be, instead of a circular cylindrical shape, an elliptic cylindrical shape or a polygonal cylindrical shape.

As shown in FIG. 1, the substrate 11 includes inflow-side cells 21 and outflow-side cells 22. Each inflow-side cell 21 is a space, the space extending in the exhaust gas flow direction X and having an open end located on the inflow side thereof and a closed end located on the outflow side thereof in the flow direction X. Each outflow-side cell 22 is a space, the space extending in the exhaust gas flow direction X and having a closed end located on the inflow side thereof and an open end on the outflow side thereof in the flow direction X.

The inflow-side cell 21 is closed by a sealing portion 24 at the end on the exhaust gas outflow-side in the downstream end portion R2 in the exhaust gas flow direction X, but is open at the end on the exhaust gas inflow-side in the upstream end portion R1. The outflow-side cell 22 is closed by a sealing portion 25 at the end on the exhaust gas inflow-side in the upstream end portion R1, but is open at the end on the exhaust gas outflow-side in the downstream end portion R2. The inflow-side cell 21 and the outflow-side cell 22 are configured such that a gas, a liquid, and the like can flow through the open ends, but the flow of exhaust gas is blocked at the sealing portions 24 and the sealing portions 25, which are closed portions. The inflow-side cell 21 and the outflow-side cell 22 are each a space having the shape of a hole with a bottom and extending in the axis direction of the substrate 11. The shape of the space in a cross section perpendicular to the axis direction of the substrate 11 may be any geometric shape such as a quadrilateral including a square, a parallelogram, a rectangle, and a trapezoid, a polygon including a triangle, a hexagon, and an octagon, a circular shape, and an elliptic shape.

A porous partition wall 23 is formed between an inflow-side cell 21 and an outflow-side cell 22 adjacent to the inflow-side cell 21 so as to divide the inflow-side cell 21 and the outflow-side cell 22. The inflow-side cell 21 and the outflow-side cell 22 are separated by the partition wall 23. The partition wall 23 serves as an inner-side wall of the inflow-side cell 21 as well as that of the outflow-side cell 22, which are each in the form of a hole with a bottom. The partition wall 23 has a porous structure to allow a gas such as exhaust gas to pass therethrough. The thickness of the partition wall 23 is preferably 150 μm to 400 μm, for example.

In the substrate 11, a catalyst portion containing a catalytically active component is provided. As shown in FIG. 2, the catalyst portion includes a first catalyst portion 14 that is in the form of a layer (hereinafter also referred to as "first catalyst layer 14") and second catalyst portions 15 that is in the form of a layer (hereinafter also referred to as "second catalyst layer 15"). The first catalyst portion 14 is provided at least on a portion of a side of the partition wall 23 that faces the inflow-side cell 21, the portion being located on the upstream side in the exhaust gas flow direction X (hereinafter also referred to as "direction X"). The second catalyst portion 15 is provided at least on a portion of a side of the partition wall 23 that faces the outflow-side cell 22, the portion being located on the downstream side in the exhaust gas flow direction X.

The length L1 (see FIG. 2) of the first catalyst layer 14 in the direction X is preferably 20% to 60%, and more preferably 30% to 50%, based on the length L (see FIG. 2) of the substrate 11 in the direction X, in view of improving exhaust gas purification performance while reducing pressure loss and of delivering favorable PM collection performance. The length L2 (see FIG. 2) of the second catalyst layer 15 in the direction X is preferably 50% to 90%, and more preferably 60% to 80%, based on the length L of the substrate 11 in the direction X, in view of improving exhaust gas purification performance while reducing pressure loss and of delivering favorable PM collection performance. The first catalyst layer 14 is preferably formed so as to extend from the upstream end portion in the exhaust gas flow direction, and the second catalyst layer 15 is preferably formed so as to extend from the downstream end portion in the exhaust gas flow direction.

The total length of the length L1 of the first catalyst layer 14 in the direction X and the length L2 of the second catalyst layer 15 in the direction X, L1+L2, is preferably longer than the length L of the substrate 11 in the direction X, in view of improving exhaust gas purification performance, and (L1+L2)/L is preferably 1.05 or greater. In view of reducing pressure loss, (L1+L2)/L is preferably 1.40 or less, more preferably 1.35 or less, and even more preferably 1.30 or less.

The length of the first catalyst layer 14 and that of the second catalyst layer 15 can each be determined using the following preferable method: the lengths of ten arbitrarily selected catalyst layers are visually measured on a cross section of the exhaust gas purification catalyst 10 taken along the axis direction of the substrate 11 and the average is calculated to obtain the length of the catalyst layer. If the boundary between the first catalyst layer 14 and the second catalyst layer 15 in the exhaust gas flow direction cannot be visually determined, the boundary can be identified in the following manner: the composition is analyzed at multiple positions (e.g., 8 to 16 positions) on the exhaust gas purification catalyst along the exhaust gas flow direction, and the boundary is identified on the basis of the content of a catalytically active component in the composition at each position. The content of a catalytically active component at each position can be determined by, for example, X-ray fluorescence analysis (XRF) or ICP emission spectrometry (ICP-AES).

The first catalyst layer 14 is preferably formed so as to extend from the upstream end portion R1 of the substrate 11 in the direction X toward the downstream side, in view of improving exhaust gas purification performance while ensuring ease of production. Similarly, the second catalyst layer 15 is preferably formed so as to extend from the downstream end portion R2 of the substrate 11 in the direction X toward the upstream side.

The catalytically active component contained in the first catalyst layer 14 and the catalytically active component contained in the second catalyst layer 15 may be the same or different from each other. Examples of the catalytically active component include platinum group metals. Specifically, platinum (Pt), palladium (Pd), rhodium (Rh), ruthenium (Ru), iridium (Ir), and osmium (Os) can be used singly or in combination of two or more thereof. In view of exhaust gas purification performance, the content of the catalytically active component in the first catalyst layer 14 and that in the second catalyst layer 15 are each independently preferably 0.001 mass % or greater, more preferably 0.01 mass % or greater, and most preferably 0.05 mass % or greater, based on the total amount of components contained in the catalyst layer. On the other hand, the content of the catalytically active component in the first catalyst layer 14 and that in the second catalyst layer 15 are each independently preferably 25 mass % or less, more preferably 20 mass % or less, and particularly preferably 15 mass % or less, in view of the balance between exhaust gas purification performance and cost.

It is more preferable that the catalytically active component contained in the first catalyst layer 14 and that in the second catalyst layer 15 be different from each other. It is especially preferable that the first catalyst layer 14 contain a noble metal selected from platinum (Pt), palladium (Pd), and rhodium (Rh), and that the second catalyst layer 15 contain a noble metal that is selected from platinum (Pt), palladium (Pd), and rhodium (Rh) but is different from the noble metal contained in the first catalyst layer 14, in view of efficient purification of harmful components of exhaust gas, such as $NO_x$, CO, and HC.

In view of improving heat resistance of the exhaust gas purification catalyst 10 even further, the amount of catalytically active component contained in the first catalyst layers 14 is preferably approximately from 0.1 g to 15 g, and more preferably from 1 g to 8 g, per liter of volume of the substrate, and the amount of catalytically active component contained in the second catalyst layers 15 is preferably approximately from 0.01 g to 5 g, and more preferably from 0.1 g to 1 g, per liter of volume of the substrate.

In view of improving exhaust gas purification performance during start-up, the mass of catalytically active component contained in the first catalyst layers 14 per liter of volume of the substrate is preferably greater than the mass of catalytically active component contained in the second catalyst layers 15 per liter of volume of the substrate, and is more preferably 1.1 times or more, particularly preferably from 1.3 times to 20 times, and even more preferably from 1.5 times to 15 times greater than the mass of catalytically active component contained in the second catalyst layers 15 per liter of volume of the substrate.

As used herein, the volume of the substrate refers to the volume that includes not only the solid portion of the substrate but also the volumes of the first catalyst layer 14, the second catalyst layer 15, the pores in the partition wall 23, and the spaces of the cells 21 and 22.

With respect to the volume of pores with a pore size of 10 μm to 18 μm, in the exhaust gas purification catalyst 10, the first pore volume is greater than the second pore volume, where the first pore volume is a pore volume of pores with a pore size of 10 μm to 18 μm, as measured on the first catalyst portions and the partition walls within a region where the first catalyst portions are provided, and where the second pore volume is a pore volume of pores with a pore size of 10 μm to 18 μm, as measured on the second catalyst portions and the partition walls within a region where the second catalyst portions are provided.

A wall flow-type substrate used in a GPF usually exhibits a peak of the pore size derived from the substrate itself within a range of 10 μm to 18 μm or near this range. Therefore, the first pore volume greater than the second pore volume indicates that, in partition walls, the extent of penetration of the second catalyst layer 15 into the partition wall is greater than that of the first catalyst layer 14. The inventors of the present invention have found that exhaust gas purification performance during high speed driving is improved by the catalyst having such a configuration. One of the reasons for this is that, when the catalyst has such a configuration, the flow of exhaust gas is not obstructed and is likely to come into contact with both the first catalyst layer 14 and the second catalyst layer 15, and that accordingly, the efficiency of contact with the catalytically active components is favorable.

The first pore volume can be determined by the following method on samples obtained by cutting out a portion in which the first catalyst layers 14 are formed on the partition walls 23 and in which any second catalyst layers 15 are not formed. The second pore volume can be determined by the following method on samples obtained by cutting out a portion in which the second catalyst layers 15 are formed on the partition walls 23 and in which any first catalyst layers 14 are not formed.

A specific method of preparing samples is, for example, as described below. When cutting the partition walls of the substrate, the partition walls are preferably cut along a cross section perpendicular to the axis direction of the substrate 11.

Preparation of samples for determining the first pore volume: 1 $cm^3$ cubes (cubes with each side having a length of 1 cm) are cut out at a position spaced apart from the upstream end portion R1 of the substrate by a distance corresponding to 10% of the overall length L.

Preparation of samples for determining the second pore volume: 1 $cm^3$ cubes (cubes with each side having a length of 1 cm) are cut out at a position spaced apart from the downstream end portion R2 of the substrate by a distance corresponding to 10% of the overall length L.

The number of samples: five samples are prepared to determine the first pore volume, and five samples are prepared to determine the second pore volume.

The pore volume is determined based on a mercury intrusion porosimetry according to JIS R 1655:2003. To be specific, a cut-out sample is dried at 150° C. for one hour, and thereafter the pore volume of the sample is measured at room temperature (20° C.) using a mercury intrusion porosimeter for determining pore distribution (AutoPore IV 9520 available from Micromeritics Instrument Corporation). The mercury intrusion pressure is set to 0.0048 MPa at the start of measurement, and the maximum mercury intrusion pressure is set to 255.1060 MPa. Pore volume is measured at a total of 131 pressure points including these values. On each point, pressure application is maintained for 10 seconds.

In view of improving exhaust gas purification performance during high speed driving, the ratio of the second pore volume V2 to the first pore volume V1, V2/V1, of the exhaust gas purification catalyst 10 is preferably 0.95 or less, more preferably 0.8 or less, and particularly preferably 0.7 or less. On the other hand, in view of reducing pressure loss, the ratio of the second pore volume V2 to the first pore volume V1, V2/V1, is preferably 0.4 or greater, more preferably 0.5 or greater, and particularly preferably 0.6 or greater.

In order to make the first pore volume greater than the second pore volume, conditions can be tailored, including the particle sizes of metal oxide particles contained in the first catalyst layer 14 and the second catalyst layer 15, the amounts of the coatings for the first catalyst layer 14 and the second catalyst layer 15, the firing temperatures for producing the first catalyst layer 14 and the second catalyst layer 15, the viscosities of slurries, and/or whether or not a pore-forming material is used. By using, for the first catalyst layers 14, metal oxide particles having a particle size that makes it difficult for the particles to enter the pores of the partition walls 23, and using, for the second catalyst layers 15, metal oxide particles having a particle size that makes it easy for the particles to enter the pores of the partition walls 23, the first pore volume can be easily made greater than the second pore volume, whereby the value of V2/V1 can fall within the above-described range. Moreover, the value of V2/V1 can also fall within the above-described range by adjusting the particle sizes of the metal oxide particles for the first catalyst layers 14 and the second catalyst layers 15, and the amounts of the coatings for the first catalyst layer 14 and the second catalyst layer 15. However, the present invention is not limited by these approaches.

In view of heat resistance, the first catalyst layer 14 preferably exhibits a peak top of the pore size at between 20 nm and 500 nm, and more preferably between 20 nm and 100 nm, as measured on the first catalyst layers 14 in a region where the first catalyst layers 14 are provided.

The meaning of the expression "the first catalyst layer 14 exhibits a peak top of the pore size at between 20 nm and 500 nm" is as follows: the pore volume and the pore size are measured on the first catalyst layers 14 and the partition walls within a region where the first catalyst layers 14 are provided, followed by drawing a graph with the pore volume on the vertical axis and the pore size on the horizontal axis, and a peak having the greatest peak height in a pore size range of not greater than 500 nm is exhibited in a pore size range between 20 nm and 500 nm. Because the peak of the pore size derived from the partition walls of the substrate is exhibited in a range of greater than 500 nm, a peak that is exhibited at or below that upper limit is understood as a peak derived from the first catalyst layer 14.

In order that the first catalyst layer 14 exhibits the peak top of the pore size at between 20 nm and 500 nm, metal oxide particles having a particle size within a preferable range, which will be described later, can be used, for example, in a preferred method for producing the exhaust gas purification catalyst 10, which will be described later, or conditions can be tailored, including the amounts of the coatings for the first catalyst layer 14 and the second catalyst layer 15, the firing temperatures for producing the first catalyst layer 14 and the second catalyst layer 15, the viscosities of slurries, and/or whether or not a pore-forming material is used and the amount thereof.

A preferred composition of the first catalyst layer 14 will be further described. It is preferable that the first catalyst layer 14 further contain a carrier component for supporting the catalytically active component, or a component serving as a catalytic promoter, in view of efficiently delivering exhaust gas purification performance of the catalytically active component. Metal oxides may be used as the carrier component or the component serving as a catalytic promoter, and specific examples thereof include an inorganic oxide that acts as an oxygen storage component (also referred to as "OSC material", wherein OSC is an abbreviation for "oxygen storage capacity") and an inorganic oxide other than an oxygen storage component. In the first catalyst layer 14, it is preferable that both an inorganic oxide that acts as an oxygen storage component and an inorganic oxide other than an oxygen storage component support the catalytically active component.

The term "support" and derivatives thereof herein means a state in which a catalytically active component is physically or chemically adsorbed or held on the outer surface of a component or inner surfaces of pores of a component. Specifically, whether a particle supports another particle can be determined, for example, in the following manner. A cross-section of the exhaust gas purification catalyst 10 is analyzed by energy dispersive X-ray spectroscopy (EDS) to obtain an elemental mapping image; it is checked whether the element of one particle and the element of the other particle are present in the same region on the elemental mapping image; and if it is confirmed that the element of one particle and the element of the other particle are present in the same region, it is determined that a particle is "supported" on another particle.

As the inorganic oxide that acts as an oxygen storage component, a metal oxide that is multivalent and is capable of storing oxygen can be used. Examples thereof include $CeO_2$, a ceria-zirconia composite oxide (hereinafter also referred to as $CeO_2$—$ZrO_2$), iron oxide, and copper oxide. An oxide of a rare earth element other than Ce is also preferably used in view of thermal stability. Examples of the oxide of a rare earth element other than Ce include $Sc_2O_3$, $Y_2O_3$, $La_2O_3$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, and $Lu_2O_3$. $CeO_2$—$ZrO_2$ herein refers to a solid solution of $CeO_2$ and $ZrO_2$. Whether a solid solution of $CeO_2$ and $ZrO_2$ has been formed can be confirmed by checking whether or not a single phase derived from $CeO_2$—$ZrO_2$ is formed, using an X-ray diffraction (XRD) apparatus.

In particular, in view of the balance between heat resistance and OSC, the amount of $CeO_2$ contained in the first catalyst layer 14 is preferably 10 mass % to 45 mass %, and more preferably 15 mass % to 35 mass %. The amount of $ZrO_2$ contained in the first catalyst layer 14 is preferably 20 mass % to 55 mass %, and more preferably 25 mass % to 45 mass %. The preferred amounts of $CeO_2$ and $ZrO_2$ here include the amounts of $CeO_2$ and $ZrO_2$ in the form of a solid solution.

The inorganic oxide other than an oxygen storage component that can be contained in the first catalyst layer 14 may be a metal oxide other than an oxygen storage component. Examples thereof include alumina, silica, silica-alumina, titanium, and aluminosilicates. In particular, alumina is preferably used in view of heat resistance. The amount of alumina contained in the first catalyst layer 14 is preferably 8 mass % to 30 mass %, and more preferably 10 mass % to 25 mass %.

A preferred composition of the second catalyst layer 15 will be further described. It is preferable that the second catalyst layer 15 further contain a carrier component for supporting the catalytically active component in view of efficiently delivering exhaust gas purification performance of the catalytically active component. As the carrier component, the metal oxides listed above for the first catalyst layer 14 can be used.

As the inorganic oxide that acts as an oxygen storage component, those listed above for the first catalyst layer 14 can be used. Out of these, ceria or a ceria-zirconia composite oxide is preferably used in view of higher OSC of the exhaust gas purification catalyst. In particular, in view of the balance between heat resistance and OSC, the amount of $CeO_2$ contained in the second catalyst layer 15 is preferably 3 to 30 mass %, and more preferably 5 mass % to 20 mass %. The amount of $ZrO_2$ contained in the second catalyst layer 15 is preferably 35 mass % to 75 mass %, and more preferably 40 mass % to 70 mass %. The preferred amounts of $CeO_2$ and $ZrO_2$ here include the amounts of $CeO_2$ and $ZrO_2$ in the form of a solid solution.

As the inorganic oxide other than an oxygen storage component that can be contained in the second catalyst layer 15, those listed above for the first catalyst layer 14 can be used. In particular, alumina is preferably used in view of excellent heat resistance. The amount of the inorganic oxide other than an oxygen storage component in the second catalyst layer 15 is preferably 5 mass % to 40 mass %, and more preferably 5 mass % to 25 mass %.

The first catalyst layer 14 may be formed in an inner part of the partition wall 23 or on the surface of the partition wall 23; however, it is preferable that the first catalyst layer 14 be formed on the surface of the partition wall 23 in view of further improving exhaust gas purification performance during high speed driving. As used herein, the expression "the first catalyst layer 14 is formed on the surface of the partition wall 23" refers to a state in which the first catalyst layer 14 is present mainly on the surface of the partition wall 23 and not mainly in an inner part of the partition wall 23. More specifically, whether the first catalyst layer 14 is present mainly on the surface can be checked by, for example, observing a cross section of the partition wall where the first catalyst layer 14 is provided, using a scanning electron microscope (JEM-ARM200F available from JEOL, Ltd.), and performing energy dispersive X-ray spectrometry (EDS) to line-analyze the boundaries between elements that are present only in the substrate (for example, Si and Mg) and elements that are present only in the catalyst layer (for example, Ce and Zr), or performing an analysis using an electron probe micro analyzer (EPMA).

As used herein, the expression "present mainly on the surface" means a state in which, when the exhaust gas purification catalyst 10 is observed in a cross section taken along a plane perpendicular to the axis direction, the mass of the first catalyst layer 14 present on the surface of the partition wall 23 per unit cross section thereof is larger than the mass of the first catalyst layer 14 present in the inner part the partition wall 23 per the same unit cross section. The term "unit cross section" refers to, for example, a 5 mm×5 mm area.

The second catalyst layer 15 may be formed on the surface of the partition wall 23 or in an inner part of the partition wall 23; however, it is preferable that at least a part of the second catalyst layer 15 be present in an inner part of the partition wall 23. In view of, for example, reducing pressure loss and improving exhaust gas purification performance during high speed driving, the second catalyst layer 15 preferably has a configuration such that, in a region extending from the downstream end portion R2 toward the upstream side in the exhaust gas flow direction X by a length corresponding to 1/10 of the length L of the substrate (by a length of 0.1 L), the percentage of the mass of the second catalyst layer 15 present in the inner part of the partition wall 23 is larger than the percentage of the mass of the second catalyst layer 15 present on the surface of the partition wall when the total amount of the coating is taken as 100 mass %.

FIG. 3 schematically shows a state in which the first catalyst layer 14 is formed on the surface of the partition wall 23 and in which the second catalyst layer 15 is formed in the inner part of the partition wall 23. As shown in FIG. 3, even if a catalyst layer is present in the inner part a partition wall 23, it is preferable that, in the thickness direction of the partition wall 23, the catalyst layer be present closer to the cell to which it is applied. In an embodiments of the present invention, the first catalyst layer 14 is formed on the surface of the partition wall 23 while the second catalyst layer 15 is formed in the inner part of the partition wall 23, as shown in FIG. 3; both the first catalyst layer 14 and the second catalyst layer 15 are formed on the surface of the partition wall 23; or both the first catalyst layer 14 and the second catalyst layer 15 are formed in the inner part of the partition wall 23. Of these, it is preferable to adopt the configuration in which the first catalyst layer 14 is formed on the surface of the partition wall 23 while the second catalyst layer 15 is formed in the inner part of the partition wall 23, in view of improving exhaust gas purification performance during high speed driving.

Next, a preferred method for producing an exhaust gas purification catalyst according to the present invention will be described.

The production method includes the following steps (1) to (3). Steps (1) and (2) may be performed in any order.

(1) Applying a slurry for forming the first catalyst layer 14 to surfaces of the partition walls 23 that each face to an inflow-side cell 21 and then drying the slurry, wherein the slurry contains a catalytically active component and metal oxide particles having a D90 of 3 μm or greater.

(2) Applying a slurry for forming the second catalyst layer 15 to surfaces of the partition walls 23 that each face to an outflow-side cell 22 and then drying the slurry, wherein the slurry contains a catalytically active component and metal oxide particles having a D90 of 5 μm or less.

(3) Firing the substrate 11 after steps (1) and (2).

For the metal oxide particles, an inorganic oxide that acts as an oxygen storage component or an inorganic oxide other than an oxygen storage component can be used which has been described hereinabove as a component of the first catalyst layer 14 and the second catalyst layer 15. In steps (1) and (2), the catalytically active component may be in the form of water soluble salts such as a nitrate, and mixed with the metal oxide particles to obtain a slurry for forming the first catalyst layer 14 and a slurry for forming the second catalyst layer 15, respectively, and the obtained slurries may be applied to the substrate 11, and then fired in step (3). Alternatively, the catalytically active components may be supported on the metal oxide particles in advance, and slurries may be formed using the metal oxide particles on which the catalytically active components are supported. In the case where the catalytically active components are supported on the metal oxide particles in advance, a method may be used in which metal oxide particles are impregnated with an aqueous solution of a water soluble salt of a catalytically active component and then fired at a temperature of 350° C. to 550° C.

The slurry for forming the first catalyst layer 14 used in step (1) and the slurry for forming the second catalyst layer 15 used in step (2) may contain a binder for the purpose of allowing the metal oxide particles supporting the catalytically active component to come into close contact with the substrate. Examples of the binder include an alumina sol and a zirconia sol.

The metal oxide particles contained in the slurry for forming the first catalyst layer 14 used in step (1) and the metal oxide particles contained in the slurry for forming the second catalyst layer 15 used in step (2) preferably have different particle sizes D90. D90 refers to the particle size at 90% in a volume-based cumulative particle size distribution.

The metal oxide particles contained in the slurry for forming the first catalyst layer 14 have a D90 of preferably 3 μm or greater, more preferably 5 μm or greater, even more preferably 10 μm or greater, and particularly preferably 15 μm or greater, in view of successfully obtaining an exhaust gas purification catalyst in which the pore volume on the upstream side is greater than that on the downstream side, and in view of heat resistance. The D90 of the metal oxide particles contained in the slurry for forming the first catalyst layer 14 is preferably 80 μm or less, and more preferably 50 μm or less, in view of improving the dispersibility of the catalytically active component.

On the other hand, the metal oxide particles contained in the slurry for forming the second catalyst layer 15 have a D90 of preferably less than 5 μm, more preferably less than 3 μm, and particularly preferably 1 μm or less, in view of successfully obtaining an exhaust gas purification catalyst in which the first pore volume is greater than the second pore volume. The D90 of the metal oxide particles contained in the slurry for forming the second catalyst layer 15 is preferably 0.1 μm or greater, in view of heat resistance.

The D90 of metal oxide particles as used herein may be the particle size of the metal oxide particles on which a catalytically active component is supported, or may be the particle size of the metal oxide particles before the catalytically active component is supported. The D90 may be not less than the above-described preferred lower limit or not greater than the above-described preferred upper limit, either before or after the catalytically active component is supported on the metal oxide particles.

The D90 of metal oxide particles can be measured, for example, in the manner described below. Specifically, an automatic sample feeder for a laser diffraction particle size distribution analyzer (Microtrac SDC available from MicrotracBEL Corporation) is used, metal oxide particles are added to an aqueous solvent, ultrasonic waves of 40 W are applied to the resulting mixture at a flow rate of 40% for 360 seconds, and thereafter the particle size distribution is measured using a laser diffraction scattering particle size distribution analyzer (Microtrac MT3300 EXIT available from MicrotracBEL Corporation). Measurement conditions are set as follows: the particle's refractive index is 1.5; the particle shape is a perfect sphere; the solvent's refractive index is 1.3; the set zero time is 30 seconds; the measurement time is 30 seconds; and measurement is performed twice, and the average value is obtained. Pure water is used as the aqueous solvent.

The slurry for forming the first catalyst layer 14 used in step (1) preferably contains a pore-forming material in view of successfully obtaining an exhaust gas purification catalyst in which the first pore volume is greater than the second pore volume. As the pore-forming material, cross-linked polymethyl(meth)acrylate particles, cross-linked polybutyl(meth)acrylate particles, cross-linked polystyrene particles, cross-linked polyacrylic acid ester particles, or the like can be used. The pore-forming material preferably has an average particle size D50 of 0.1 μm to 100 D50 means the particle size at 50% in a volume-based cumulative particle size distribution, and can be determined by the same method as described above for the D90.

In order to apply the slurry for forming the first catalyst layer 14 used in step (1) to the substrate 11, a method may be used in which the upstream side of the substrate 11 in the exhaust gas flow direction is immersed in the slurry. The slurry may be drawn by suction from the downstream side at the same time as when the substrate 11 is immersed. In this manner, the slurry for forming the first catalyst layer 14 passes through the opening of the inflow-side cell on the upstream side of the substrate 11 in the X direction and is applied to a surface of the partition wall 23 that faces the inflow-side cell on the upstream side of the substrate 11. Due to the particle size of the metal oxide particles described above, most of the metal oxide that constitutes the first catalyst layer 14 is located on the surface of the partition wall 23.

In order to apply the slurry for forming the second catalyst layer 15 used in step (2) to the substrate 11, a method may be used in which the downstream side of the substrate 11 in the exhaust gas flow direction is immersed in the slurry. The slurry may be drawn by suction from the upstream side at the same time as when the substrate 11 is immersed. In this manner, the slurry for forming the second catalyst layer 15 passes through the opening of the outflow-side cell on the downstream side of the substrate 11 in the X direction and is applied to a surface of the partition wall 23 that faces the outflow-side cell on the downstream side of the substrate 11. As described above, although the second catalyst layer 15 may be present in the inner part of the partition wall 23 or on the surface of the partition wall 23, it is preferable that at least a portion of the second catalyst layer 15 be present in the inner part the partition wall 23, and it is preferable that the portion of the second catalyst layer 15 that is present in the inner part of the partition wall 23 be larger than a portion thereof that is present on the surface of the partition wall 23.

In view of heat resistance and workability, the drying temperatures for drying the slurries in steps (1) and (2) are preferably 40° C. to 120° C. The firing temperature in step (3) is preferably 350° C. to 550° C.

The amount of the obtained first catalyst layer 14 is preferably less than the amount of the obtained second catalyst layer 15, in view of reducing pressure loss and of exhaust gas purification performance during high speed driving. The amount of coating for the first catalyst layer 14 is preferably 50 g or less per liter of volume of the substrate in view of reducing pressure loss and of exhaust gas purification performance during high speed driving, and is preferably 5 g or greater in view of improving exhaust gas purification performance and of favorable PM collection. In particular, the amount of coating for the first catalyst layer 14 is more preferably 8 g or greater, or 40 g or less.

The amount of coating for the second catalyst layer 15 is preferably 80 g or less per liter of volume of the substrate in view of reducing pressure loss, for example, and is preferably 20 g or greater in view of improving exhaust gas purification performance. In particular, the amount of coating for the second catalyst layer 15 is more preferably 30 g or greater, or 70 g or less.

When the exhaust gas purification catalyst obtained through the above-described production method is used as a particulate filter, exhaust gas flows into the catalyst from the inflow-side cells 21 of the substrate 11, as shown in FIG. 2. The exhaust gas flowing into the catalyst from the inflow-side cells 21 passes through the porous partition walls 23, and reaches the outflow-side cells 22. In FIG. 2, the routes along which the exhaust gas flowing into the inflow-side cells 21 passes through the partition walls 23 and reaches the outflow-side cells 22 are indicated by arrows. Since the partition walls 23 have a porous structure, PM is collected on the surfaces of the partition walls 23 and in the pores in the inner part of the partition walls 23 while the exhaust gas passes through the partition walls 23. Also, since each partition wall 23 has the first catalyst layer 14 and the second catalyst layer 15, harmful components contained in the exhaust gas are purified while the exhaust gas passes through the inner part and the surface of the partition walls 23. Exhaust gas that has passed through the partition walls 23 and reached the outflow-side cells 22 is discharged to the outside of the exhaust gas purification catalyst 10 through the openings on the exhaust gas outflow-side.

In the exhaust gas purification catalyst 10 thus produced, the first pore volume is greater than the second pore volume and the first catalyst portion exhibits the main peak of the pore size at within a specific range, whereby not only the heat resistance but also the exhaust gas purification performance during high speed driving are excellent.

In the present invention, as a method for measuring the amounts of ceria and zirconia and also an inorganic oxide other than an oxygen storage component, of the above-described various components, a method can be employed in which the amounts of metals, such as cerium, zirconium, and aluminum, in a solution obtained by completely dissolving each catalyst layer are measured using ICP-AES. The amounts of the catalytically active components contained per single porous substrate 11 can be determined by, for example, measuring the amounts of noble metals in a solution obtained by completely dissolving the catalyst layers using ICP-AES.

In the case where a catalyst layer is provided in the inner part of the partition wall of the substrate, the amounts of the catalytically active components can be determined by subtracting the amounts of metals contained in a solution obtained by completely dissolving only the substrate from the amounts of metals contained in a solution obtained by completely dissolving the catalyst layers and the substrate.

EXAMPLES

Hereinafter, the present invention will be described in greater detail by way of Examples. However, the scope of the present invention is not limited to Examples below. Both drying and firing were performed in the atmosphere.

Example 1

1. Preparation of Slurries

A $CeO_2$—$ZrO_2$ solid solution powder with a D90 of 20 μm (the $CeO_2$—$ZrO_2$ solid solution contained 40 mass % of $CeO_2$ and 50 mass % of $ZrO_2$) and an alumina powder with a D90 of 20 μm were provided. The $CeO_2$—$ZrO_2$ solid solution powder and the alumina powder were mixed at a mass ratio of 3:1, and the mixture was impregnated with an aqueous solution of palladium nitrate.

Next, the resulting mixed solution was mixed with a pore-forming material (cross-linked polymethyl(meth)acrylate particles), an alumina sol, a zirconia sol, and water serving as a liquid medium, to prepare a slurry for the first catalyst layer 14.

On the other hand, a $CeO_2$—$ZrO_2$ solid solution powder with a D90 of 0.5 μm (the $CeO_2$—$ZrO_2$ solid solution contained 15 mass % of $CeO_2$ and 70 mass % of $ZrO_2$) and an alumina powder with a D90 of 0.5 μm were mixed, and the mixture was impregnated with an aqueous solution of rhodium nitrate.

Next, the resulting mixed solution was mixed with an alumina sol, a zirconia sol, and water serving as a liquid medium, to prepare a slurry for forming the second catalyst layer 15.

2. Formation of Catalyst Layers

As the substrate 11, a substrate was used that had the structure shown in FIG. 1, included 300 cells/inch in a plane perpendicular to the axis direction, each cell being defined by cell partition walls with a thickness of 215 μm and extending in the axis direction, and had an outer diameter of 118.4 mm and an axial length of 91 mm. In a pore size distribution (measurement range: 1 to 1,000,000 nm) measured by the same method as for the first pore volume and the second pore volume, the substrate 11 exhibited a peak at within a range of 10 μm to 25 μm.

The catalyst carrier substrate 11 was coated with the slurry for forming the first catalyst layer 14 in the following manner. The upstream end portion of the catalyst carrier substrate 11 in the exhaust gas flow direction was immersed in the slurry, and the slurry was drawn by suction from the downstream side. Then, the substrate was dried at 70° C. for 10 minutes.

The catalyst carrier substrate 11 was coated with the slurry for forming the second catalyst layer 15 in the following manner. The downstream end portion of the catalyst carrier substrate 11 in the exhaust gas flow direction was immersed in the slurry, and the slurry was drawn by suction from the upstream side. Then, the substrate was dried at 70° C. for 10 minutes.

After that, the substrate was fired at 450° C. for one hour. Thus, an exhaust gas purification catalyst 10 of Example 1 was obtained. The obtained first catalyst layers 14 contained 27.4 mass % of $CeO_2$, 37.5 mass % of $ZrO_2$, 19.6 mass % of alumina, and 9.5 mass % of Pd. On the other hand, the second catalyst layers 15 contained 12.3 mass % of $CeO_2$, 62.8 mass % of $ZrO_2$, 11.2 mass % of alumina, and 0.5 mass % of Rh.

In the exhaust gas purification catalyst of Example 1, the first catalyst layers 14 of the exhaust gas purification catalyst 10 were each formed on a surface of the partition wall 23 that faced the inflow-side cell 21 so as to extend from the upstream end portion R1 toward the downstream side in the exhaust gas flow direction X to 40% of the overall length L, and the amount of coating per 1 L of volume of the substrate was 10 g/L. The amount of Pd contained in the first catalyst layers 14 per 1 L of volume of the substrate was 0.95 g/L.

The second catalyst layers 15 of the exhaust gas purification catalyst 10 were each formed in the inner part of the partition wall 23 that faced the outflow-side cell 22 so as to extend from the downstream end portion R2 toward the upstream side in the exhaust gas flow direction X to 70% of the overall length L, and the amount of coating per 1 L of volume of the substrate was 50 g/L. The amount of Rh contained in the second catalyst layers 15 per 1 L of volume of the substrate was 0.25 g/L.

Examples 2 to 13

Exhaust gas purifying catalysts of Examples 2 to 13 were obtained in the same manner as in Example 1, except that the conditions were changed to those shown in Table 1.

Comparative Example 1

An exhaust gas purification catalyst of Comparative Example 1 was obtained in the same manner as in Example 1 except the following: the D90 of the $CeO_2$—$ZrO_2$ solid solution powder used in preparing a slurry for forming the first catalyst layer 14 was changed to 0.5 μm; the D90 of the alumina powder used in preparing the slurry for forming the first catalyst layer 14 was changed to 0.5 μm; and no pore-forming material was used in preparing the slurry for the first catalyst layer 14. The amounts of Pd and Rh per volume of the substrate were the same as those in Example 1.

Comparative Example 2

An exhaust gas purification catalyst of Comparative Example 2 was obtained in the same manner as in Comparative Example 1, except that the conditions were changed to those shown in Table 1.

Measurement of Pore Volumes

According to the method described hereinbefore, 1 $cm^3$ cubes (cubes with each side having a length of 1 cm) as upstream samples were prepared from each of the catalysts of Examples and Comparative Examples by cutting out a portion of the partition walls 23 at a position spaced apart from the upstream end portion R1 of the exhaust gas purification catalyst 10 toward the downstream side by a distance corresponding to 10% of the overall length L of the substrate 11. Likewise, 1 $cm^3$ cubes (cubes with each side having a length of 1 cm) as downstream samples were prepared from each of the catalysts of Examples and Comparative Examples by cutting out a portion of the partition walls 23 at a position spaced apart from the downstream end portion R2 toward the upstream side by a distance corresponding to 10% of the overall length L.

Figure 4:
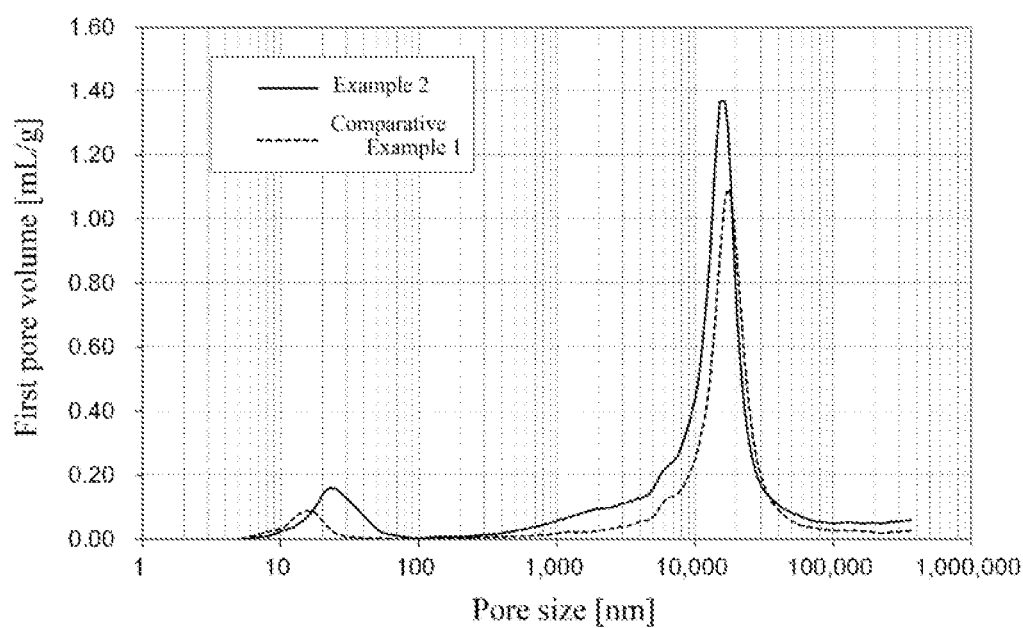
FIG. 4 shows graphs of the pore volume measured on first catalyst portions of exhaust gas purification catalysts of Example 2 and Comparative Example 1.

For the upstream samples of Example 2 and Comparative Example 1 obtained, the pore volume was measured using the method described hereinbefore, and the resulting graphs of the pore volume are shown in FIG. 4. The pore volumes of pores with a pore size of 10 μm to 18 μm on the upstream side and the downstream side, of Examples and Comparative Examples are shown in Table 1.

Measurement of Amount of $NO_x$ Emitted During High Speed Driving

Each of the exhaust gas purification catalysts of Examples and Comparative Examples was placed in an exhaust path of an engine, and the engine with the exhaust gas purifying catalyst was exposed to the following degradation conditions for a durability test comparable to driving 100,000 to 200,000 kilometers.

Degradation Conditions

Engine used for durability test: 2 L NA gasoline engine for passenger vehicles

Gasoline used: commercially available regular gasoline

Temperature and time used for degradation: 900° C. and 100 hrs.

After performing the durability test under the above-described conditions, the exhaust gas purification catalyst that had undergone the durability test was installed in a vehicle described below. As a vehicle test, the vehicle was driven in accordance with the driving conditions of the Worldwide Harmonized Light Vehicles Test Cycles (WLTC). The total amount emitted of $NO_x$ contained in the exhaust gas from the start of driving to the termination of driving (emission value "Total"), and the amount emitted of $NO_x$ contained in the exhaust gas during a high speed driving period (from 1,478 seconds to 1,800 seconds after the start of driving) (emission value "Ex High") were measured. The results are shown in Table 1.

Conditions for Determining Purification Rate

Vehicle used for evaluation: 1.5 L gasoline direct injection turbo engine

Gasoline used: fuel for verification test

Apparatus for Analyzing Exhaust gas: available from HORIBA, Ltd.

Measurement of Specific Surface Area of Catalyst Before and after Thermal Degradation The exhaust gas purification catalysts of Examples and Comparative Examples were subjected to a degradation test at 950° C. for 10 hours in the atmosphere. The specific surface area of the exhaust gas purification catalysts was measured before and after the degradation test in accordance with a BET single-point method using a QUADRASORB SI available from Quantachrome. In Table 1, the specific surface area before the degradation test is indicated by "Fresh", and the specific surface area after the degradation test is indicated by "Aged".

TABLE 1

| | First catalyst layer | | Second catalyst layer | | First catalyst layer $cm^3/g$ | Second catalyst layer $cm^3/g$ | Ratio (Second catalyst layer/ First catalyst layer) | Peak of pore size of first catalyst layer nm | Specific surface area of first catalyst layer | | Retention rate (Aged/Fresh) % | NOx purification | |
|---|---|---|---|---|---|---|---|---|---|---|---|---|---|
| | Amount of coating g/L | D90 μm | Amount of coating g/L | D90 μm | | | | | Fresh $m^2/g$ | Aged $m^2/g$ | | Ex High g/km | Total g/km |
| Ex. 1 | 10.0 | 20.0 | 50.0 | 0.5 | 0.294 | 0.111 | 0.378 | 25.52 | 73.52 | 32.89 | 44.74 | 0.0036 | 0.0113 |
| Ex. 2 | 30.0 | 20.0 | 60.0 | 0.5 | 0.260 | 0.119 | 0.457 | 23.39 | 74.14 | 35.74 | 48.21 | 0.0029 | 0.0120 |
| Ex. 3 | 10.0 | 20.0 | 40.0 | 0.5 | 0.294 | 0.137 | 0.465 | 23.39 | 66.95 | 27.93 | 41.73 | 0.0024 | 0.0096 |
| Ex. 4 | 10.0 | 20.0 | 60.0 | 0.5 | 0.252 | 0.119 | 0.472 | 23.38 | 66.95 | 27.93 | 41.73 | 0.0026 | 0.0107 |

TABLE 1-continued

| | First catalyst layer Amount of coating g/L | First catalyst layer D90 μm | Second catalyst layer Amount of coating g/L | Second catalyst layer D90 μm | Pore volume of pores with pore size of 10-18 μm First catalyst layer cm³/g | Pore volume of pores with pore size of 10-18 μm Second catalyst layer cm³/g | Ratio (Second catalyst layer/ First catalyst layer) | Peak of pore size of first catalyst layer nm | Specific surface area of first catalyst layer Fresh m²/g | Specific surface area of first catalyst layer Aged m²/g | Retention rate (Aged/Fresh) % | NOx purification Ex High g/km | NOx purification Total g/km |
|---|---|---|---|---|---|---|---|---|---|---|---|---|---|
| Ex. 5 | 20.0 | 5.0 | 60.0 | 0.5 | 0.247 | 0.119 | 0.481 | 23.38 | 75.79 | 34.13 | 45.03 | 0.0023 | 0.0110 |
| Ex. 6 | 30.0 | 20.0 | 50.0 | 0.5 | 0.260 | 0.128 | 0.495 | 23.39 | 74.14 | 35.74 | 48.21 | 0.0026 | 0.0106 |
| Ex. 7 | 20.0 | 15.0 | 60.0 | 0.5 | 0.240 | 0.119 | 0.495 | 25.51 | 74.13 | 31.55 | 42.57 | 0.0022 | 0.0109 |
| Ex. 8 | 20.0 | 5.0 | 50.0 | 0.5 | 0.247 | 0.128 | 0.520 | 23.38 | 75.79 | 34.13 | 45.03 | 0.0020 | 0.0097 |
| Ex. 9 | 20.0 | 15.0 | 50.0 | 0.5 | 0.240 | 0.128 | 0.536 | 25.51 | 74.13 | 31.55 | 42.57 | 0.0018 | 0.0096 |
| Ex. 10 | 20.0 | 5.0 | 40.0 | 0.5 | 0.247 | 0.137 | 0.553 | 23.38 | 75.79 | 34.13 | 45.03 | 0.0021 | 0.0099 |
| Ex. 11 | 20.0 | 15.0 | 40.0 | 0.5 | 0.240 | 0.137 | 0.570 | 25.51 | 74.13 | 31.55 | 42.57 | 0.0020 | 0.0098 |
| Ex. 12 | 20.0 | 20.0 | 40.0 | 0.5 | 0.224 | 0.137 | 0.610 | 25.51 | 71.35 | 32.20 | 45.13 | 0.0020 | 0.0094 |
| Ex. 13 | 20.0 | 20.0 | 50.0 | 0.5 | 0.224 | 0.151 | 0.675 | 25.51 | 71.35 | 32.20 | 45.13 | 0.0019 | 0.0092 |
| Com. Ex. 1 | 30.0 | 0.5 | 60.0 | 0.5 | 0.168 | 0.125 | 0.747 | 15.10 | 74.85 | 29.58 | 39.52 | 0.0052 | 0.0138 |
| Com. Ex. 2 | 30.0 | 0.5 | 50.0 | 0.5 | 0.168 | 0.147 | 0.878 | 15.10 | 74.85 | 29.58 | 39.52 | 0.0055 | 0.0132 |

It can be seen from Table 1 that, compared with the exhaust gas purification catalysts of Comparative Examples 1 and 2, the exhaust gas purification catalysts of Examples 1 to 13 reduced both the total amount of $NO_x$ emitted and the amount of $NO_x$ emitted during high speed driving. It can also be seen from Table 1 that the exhaust gas purification catalysts of Examples 1 to 13 retained the specific surface area even after undergoing a high thermal load and thus had superior heat resistance. In particular, it can also be seen from Table 1 that the amount of $NO_x$ emitted during high speed driving was reduced even more in Examples 2 to 7, in which the ratio of the second pore volume to the first pore volume was 0.4 or greater, and Examples 8 to 13, in which this ratio was 0.5 or greater. Thus, the exhaust gas purification catalyst according to the present invention has high heat resistance and delivers good exhaust gas purification performance during high speed driving.

Moreover, it can also be seen from FIG. 4 that the first catalyst layer exhibits the peak top of the pore size at 23.39 nm in Example 2, which exhibited high heat resistance and delivers good $NO_x$ purification performance, whereas the first catalyst layer exhibits the peak top of the pore size at 15.10 nm in Comparative Example 1.

INDUSTRIAL APPLICABILITY

According to the present invention, there can be provided a filter catalyst that has a wall flow structure, the filter catalyst having improved heat resistance and delivering higher exhaust gas purification performance during high speed driving.

The invention claimed is:
1. An exhaust gas purification catalyst comprising: a substrate, and catalyst portions provided in the substrate, the substrate including:
   inflow-side cells, each inflow-side cell being a space having an open end located on an inflow side thereof and a closed end located on an outflow side thereof in an exhaust gas flow direction;
   outflow-side cells, each outflow-side cell being a space having a closed end located on an inflow side thereof and an open end located on an outflow side thereof in the exhaust gas flow direction; and
   porous partition walls, each porous partition wall separating the inflow-side cell and the outflow-side cell from each other, and
the catalyst portions including:
   a first catalyst portion that is provided at least on a portion of a side of that faces the inflow-side cell, the portion being located on an upstream side in the flow direction; and
   a second catalyst portion that is provided at least on a portion of a side of the partition wall that faces the outflow-side cell, the portion being located on a downstream side in the flow direction,
wherein, a first pore volume is greater than a second pore volume, where the first pore volume is a pore volume of pores with a pore size of 10 μm to 18 μm, as measured on the first catalyst portions and the partition walls within a region where the first catalyst portions are provided, and where the second pore volume is a pore volume of pores with a pore size of 10 μm to 18 μm, as measured on the second catalyst portions and the partition walls within a region where the second catalyst portions are provided,
the first catalyst portion exhibits a peak top of the pore size at between 20 nm and 500 nm,
the first catalyst portion is present mainly on the surface of the partition wall, and
the second catalyst portion has a configuration such that, in a region extending from the downstream end portion toward the upstream side in the exhaust gas flow direction by a length corresponding to 1/10 of the length of the substrate, the mass of the second catalyst portion present in the inner part of the partition wall is larger than the mass of the second catalyst portion present on the surface of the partition wall.

2. The exhaust gas purification catalyst according to claim 1,
wherein a ratio of the second pore volume to the first pore volume is 0.95 or less.

3. The exhaust gas purification catalyst according to claim 1,
wherein D90 of metal oxide particles included in the first catalyst portion is 3 μm or greater.

* * * * *